United States Patent [19]

Ohta et al.

[11] Patent Number: 4,555,943

[45] Date of Patent: Dec. 3, 1985

[54] METHOD OF AND APPARATUS FOR MEASURING AN UNBALANCE VALUE OF A WHEEL MOUNTED ON A BODY OF AN AUTOMOBILE

[75] Inventors: Tsuyoshi Ohta, Urawa; Koji Uritani, Ohi, both of Japan

[73] Assignees: Riken Keiki Kabushiki Kaisha, Tokyo; Nitto Kabushiki Kaisha, Osaka, both of Japan

[21] Appl. No.: 588,296

[22] Filed: Mar. 12, 1984

Related U.S. Application Data

[63] Continuation-in-part of Ser. No. 309,939, Oct. 9, 1981, abandoned.

[30] Foreign Application Priority Data

Nov. 19, 1980 [JP] Japan .................. 55-161904

[51] Int. Cl.$^4$ .................................. G01M 1/22
[52] U.S. Cl. ............................. 73/457; 364/508
[58] Field of Search .............. 73/457, 462, 466; 364/463, 508

[56] References Cited

U.S. PATENT DOCUMENTS 3,452,603  7/1969  Kaiser et al. .................. 73/466
3,731,540  5/1973  Emanuel et al. ................ 73/457
4,162,634  7/1979  Hofmann ....................... 73/462

FOREIGN PATENT DOCUMENTS 2381302  10/1978  France ........................ 73/462

Primary Examiner—S. Clement Swisher
Assistant Examiner—John E. Chapman, Jr.
Attorney, Agent, or Firm—James E. Nilles

[57] ABSTRACT

A method of measuring an unbalance value of a wheel wherein a plurality of curves showing the relation between the magnitude of vibration of the wheel when it is rotated and the true value of the unbalance which are preliminarily obtained according to the kinds of wheel or automobile on which the wheel is mounted are memorized and compared with the magnitude of the vibration of the wheel to be tested while it is rotated. A rough value of the unbalance corresponding to the magnitude of the vibration of the wheel to be tested is obtained by using a curve M which shows the largest change of the magnitude of the vibration with respect to the true value of the unbalance. The measuring of an unbalance value is repeated with respect to the wheel on which a counter-weight corresponding to the rough value of the unbalance is attached. Apparatus for measuring an unbalance value of a wheel comprises a detecting device for detecting the magnitude of vibration of the wheel, a memory for storing a plurality of curves showing the relation between the magnitude of vibration of the wheel and the true value of unbalance which are preliminarily obtained according to the kinds of wheel or automobile, a selecting device for selecting the curves stored in the memory, and a device for calculating the unbalance value by comparing each curve selected by the selecting device with the output of the detecting device and for displaying it.

3 Claims, 12 Drawing Figures

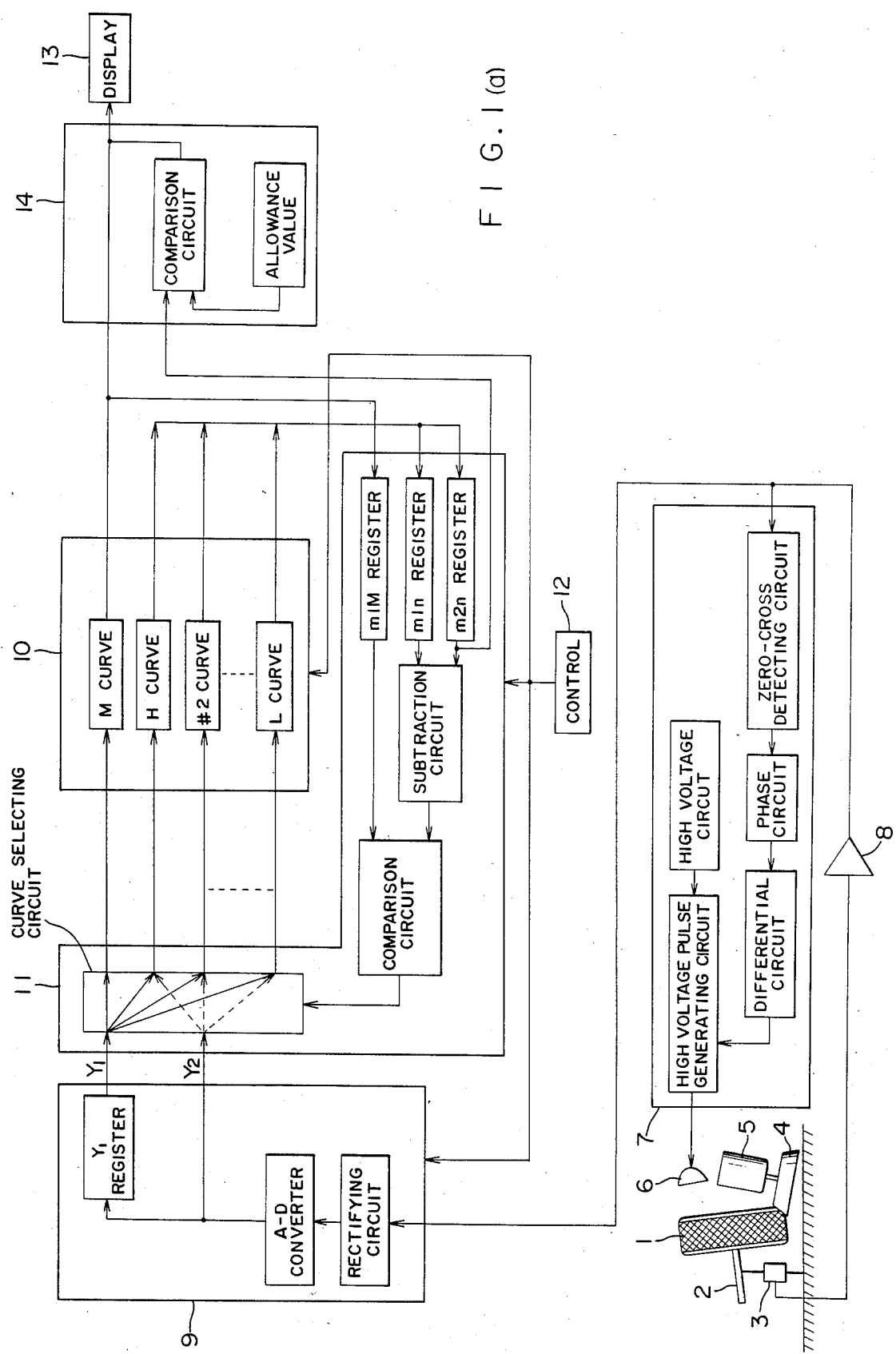
FIG. I(a)

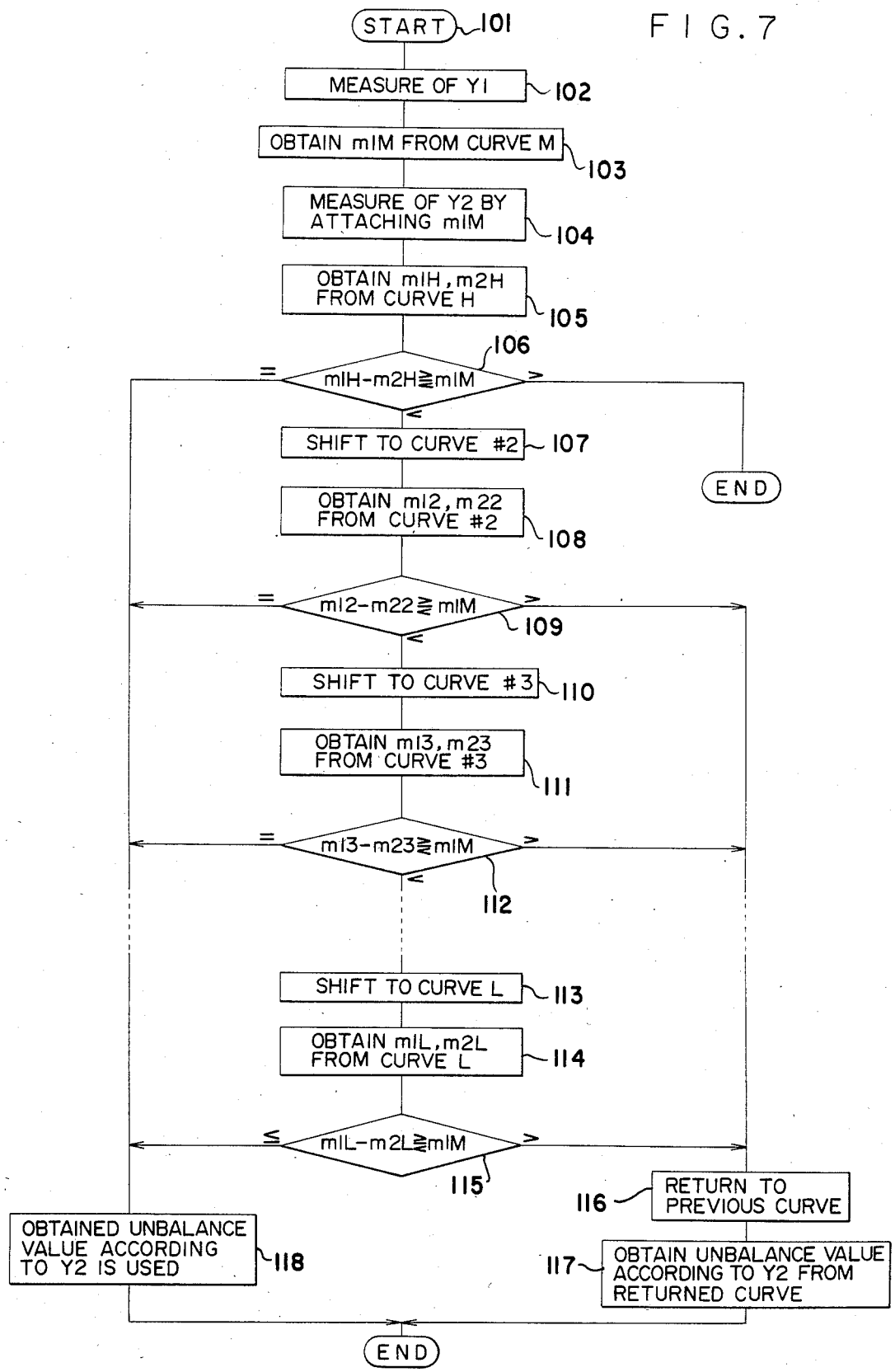

METHOD OF AND APPARATUS FOR MEASURING AN UNBALANCE VALUE OF A WHEEL MOUNTED ON A BODY OF AN AUTOMOBILE

BACKGROUND OF THE INVENTION

1. Field of the Invention

This is a continuation in part of application Ser. No. 309,939 filed Oct. 9, 1981, now abandoned.

The present invention relates to a method of and apparatus for measuring an unbalance value of a wheel mounted on a body of an automobile.

2. Description of the Prior Art

A method and apparatus have hitherto been proposed for measuring an unbalance value of a wheel in which a pickup for detecting a vertical vibration of the wheel is mounted in the vicinity of the wheel which has been lifted by means of a jack. The wheel is rotated by a wheel driving device frictionally engaged therewith and an output voltage signal is obtained from the pickup. On the one hand, a position where a counter-weight for balancing the unbalance is to be mounted is determined by flashing a lamp according to said output voltage signal as in the known strobo method in which, when the most weighty portion of the wheel while it is rotated reaches a lower dead point or a lowermost position, the lamp is flashed so that the most weighty portion of the wheel can be observed as if in a stationary state. On the other hand, the value of the counter-weight for balancing to be attached on the wheel is determined by the magnitude of the output voltage signal of the pickup.

In such conventional method and apparatus, it is necessary to repeat the measurement in order to obtain the true value and position of the unbalance because they are affected by the kinds of wheel and automobile on which the wheel is mounted as well as the position where the pickup is mounted. Specifically, it is necessary to repeat the addition and reduction of the counter-weight for balancing, thereby causing consumption of time and labor.

SUMMARY OF THE INVENTION

An object of the invention is to provide a method of and apparatus for measuring an unbalance value of a wheel, which obviate the above-mentioned defects of a conventional method and apparatus.

Another object of the present invention is to provide a method of measuring an unbalance value of a wheel characterized by comprising the steps of memorizing a plurality of curves showing the relation between the magnitude of vibration of the wheel when it is rotated and the true value of the unbalance which are obtained preliminary according to the kinds of wheel or automobile on which the wheel is mounted, of measuring the magnitude of the vibration of the wheel to be tested while it is rotated, of obtaining a rough value of the unbalance corresponding to the magnitude of the vibration of the wheel to be tested by using a curve M which shows the largest change of the magnitude of the vibration with respect to the true value of the unbalance, of measuring the magnitude of vibration of the wheel while rotating on which the counter-weight corresponding to said rough value of the unbalance is attached, and of obtaining a more precise value of the unbalance corresponding to said second-mentioned magnitude of vibration by using said second mentioned magnitude of vibration and another curve adjacent to said one selected curve.

A further object of the present invention is to provide apparatus for measuring an unbalance value of a wheel characterized by comprising detecting means for detecting the magnitude of vibration of the wheel to be tested while it is rotated, memory means for storing a plurality of curves showing the relation between the magnitude of vibration of the wheel when it is rotated and the true value of unbalance which are obtained preliminary according to the kinds of a wheel or automobile on which the wheel is mounted, selecting means for selecting the contents stored in the memory means, and means for calculating the unbalance value by comparing one curve selected by said selecting means with the output of said detecting means and for displaying it.

The above and other objects as well as advantageous features of the invention will become apparent from the following description of the preferred embodiment taken in conjunction with the accompanying drawings.

BRIEF DESCRIPTION OF THE DRAWINGS

FIG. 1(a) is a more detailed schematic diagram of the block diagram shown in FIG. 1;

FIG. 7 is a flow diagram of the present invention.

DESCRIPTION OF THE PREFERRED EMBODIMENTS

Figure 1:
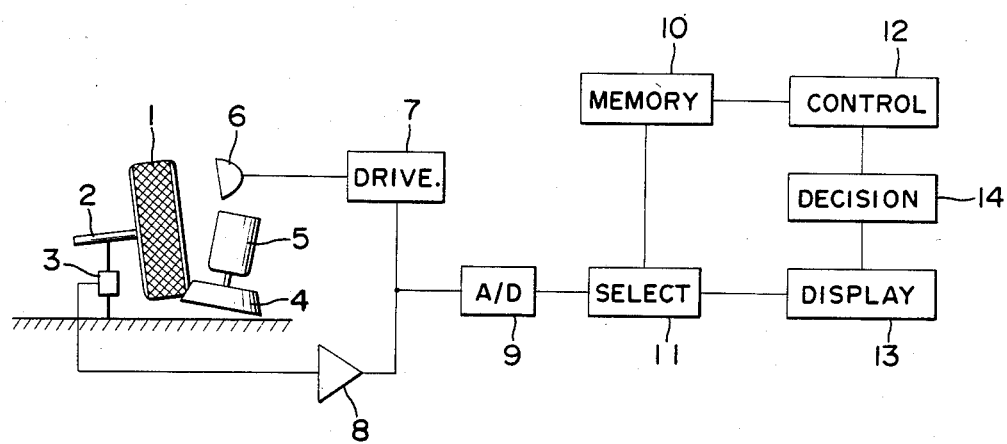
FIG. 1 is a block diagram of apparatus according to the present invention.

In FIG. 1, reference numeral 1 designates a wheel to be tested, 2 a shaft for supporting the wheel 1, 3 a pickup for picking up the oscilation of the wheel 1, 4 a driving wheel attached to the wheel 1 for rotating the wheel 1, 5 a motor for rotating the driving wheel 4, 6 a flash lamp, 7 a circuit for energizing the flash lamp 6, 8 an amplifying circuit for a voltage signal detected by the pickup 3, 9 an analog-digital converting circuit, 10 a memory circuit for storing the relation between the unbalance value and a value obtained by converting digitally the output of the pickup, 11 a selecting circuit for selecting contents stored in the memory circuit 10, 12 a sequence control circuit or a comparing and operating circuit, 13 a display circuit, and 14 a decision or discriminating circuit.

In the present invention, as a first step, a suitable mark is formed by using a chalk, for example, on the wheel 1 in order to find easily a position of unbalance of the wheel when it is rotated.

The wheel 1 is lifted and support on the ground through the pickup 3, and rotated by the driving wheel 4. An oscillation in the vertical direction of the shaft 2 generated by the rotation of the wheel 1 is detected by the pickup 3 and amplified suitably by the amplifying circuit 8 so as to energize the flash lamp 6 through the energizing circuit 7 at an instant when the unbalance position of the wheel 1 arrives at the lower dead point and to enable observation of the mark on the wheel 1 as if in a stationary state. Accordingly, both the lower position of the wheel and the mark previously formed can be observed, so that a position on which a counter-balance is to be attached can be determined. Specifically, the position is an upper portion of the wheel 1 when the wheel 1 is positioned such that the mark is positioned similar to the position observed previously.

Figure 2:
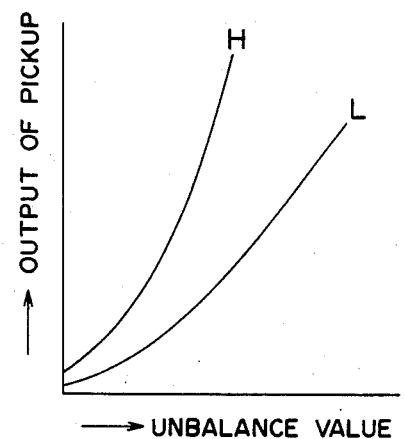
FIGS. 2, 3(a), 3(b), 3(c), 4(a), 4(b), 4(c), 5 and 6 are graphs each showing the relation between an output of a pickup and unbalance value.

The relation between the unbalance value and the output value of the pickup 3 cannot be specified because it is affected by the kind of the automobile on which the wheel 1 is mounted, and the mounted state of the pickup 3 to the shaft 2, etc.. However, if the condition or manner of measurement of balance is specified, the inherent relation between the unbalance value and the output value of the pickup can be obtained by experiments. A relation in which the output value of the pickup 3 becomes minimal with respect to the unbalance value is shown as a curve L in FIG. 2. A relation in which the output value of the pickup 3 becomes maximum with respect to the unbalance value is shown as a curve H in FIG. 2.

Figure 3A:
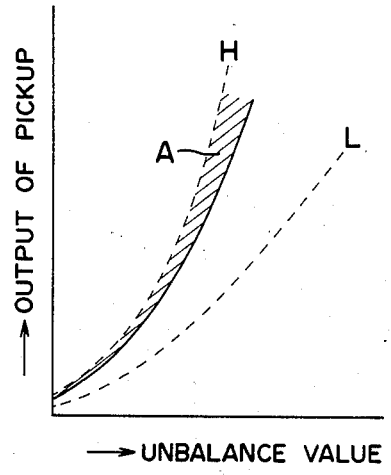
Figure 3B:
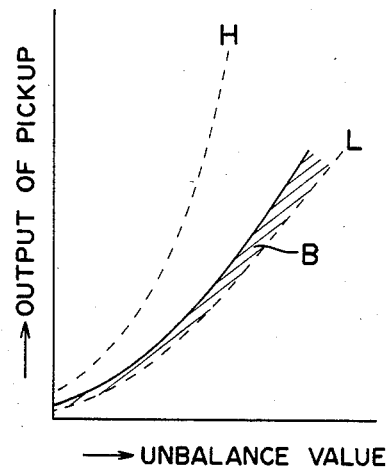
Figure 3C:
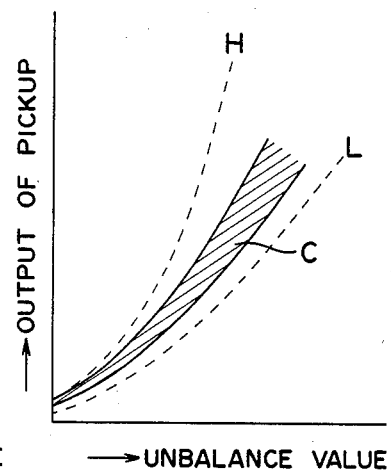

Due to the fluctuations of the results of the measurements with respect to the same automobile, curves showing the relation between the unbalance value and the output value of pickup 3 for different wheels are distributed in areas A, B and C in FIGS. 3(a), 3(b) and 3(c), respectively. It is recognized that the areas A, B and C are located between the curves L and H in FIG. 2.

Figure 4A:
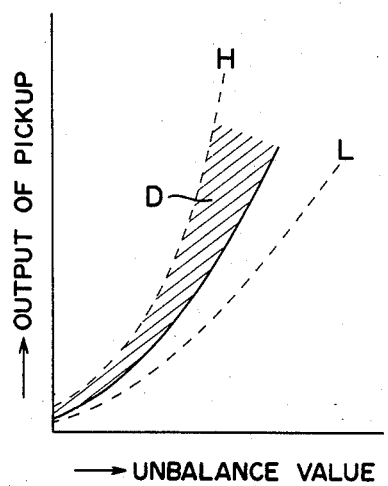
Figure 4B:
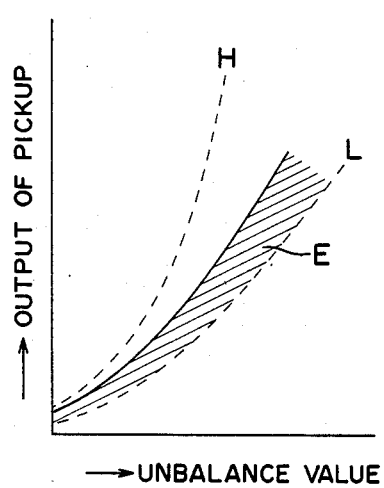
Figure 4C:
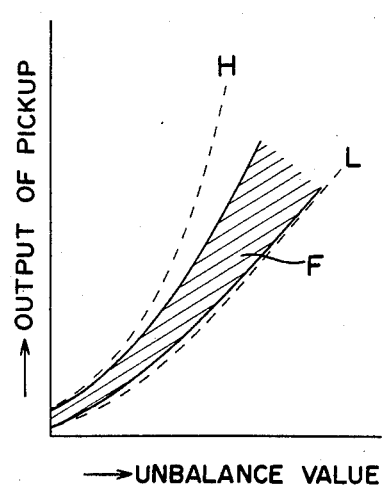

When the mounting state of the pickup 3 is varied with respect to the same wheel, curves showing the relation between the unbalance value and the output value of the pickup 3 for different kinds of automobiles are distributed in areas D, E and F in FIGS. 4(a), 4(b) and 4(c), respectively. The areas D, E and F are also located between the curves L and H in FIG. 2.

Figure 5:
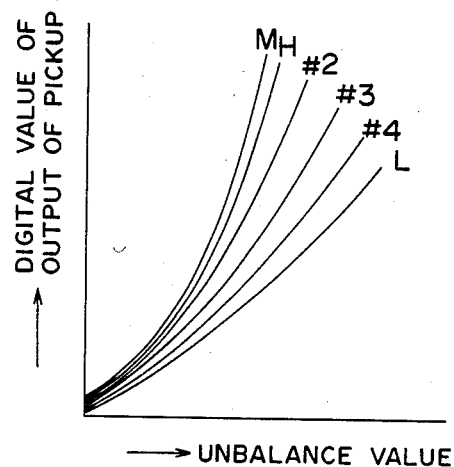

Accordingly, the curve H, curves #2, #3 and #4 located between the curves H and L and curve L as shown in FIG. 5 are stored in the memory circuit 10. A curve M positioned just above the curve H is also stored in the memory circuit 10. In this case, a value corresponding to the output value of the pickup 3 is stored as an address of the memory circuit and the unbalanced value corresponding thereto is stored as data. In order to store the curves M, H, #2, #3 ... L shown in FIG. 5, the memory circuit can easily comprise a programable read only memory (P-ROM).

Figure 6:
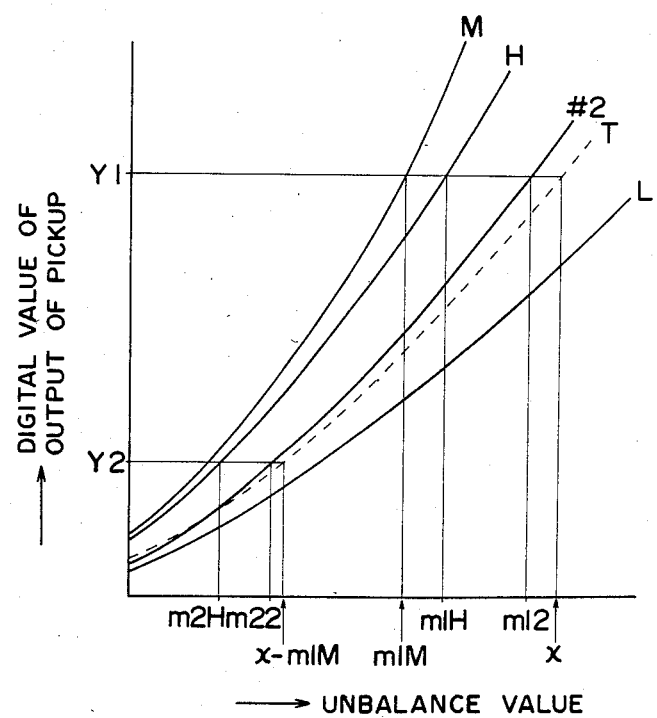

The detection signal obtained from the pickup 3 due to the unbalance of the wheel 1 is amplified by an amplifier circuit 8 and converted into a digital value by an analog-digital converter circuit 9. It is assumed that the digital value is $Y_1$ shown in FIG. 6. In a case when an unbalance value is to be obtained for a first time, an unbalance value m1M(g) corresponding to $Y_1$ is obtained by stating the curve M of the memory circuit 10 by using sequence control circuit 12. An actual or true unbalance value X(g) is a value always larger than m1M(g), because a curve T of the actual unbalance value X(g) would be always located between the curves H and L. The value m1M(g), because a curve T of the actual unbalance value X(g) would be always located between the curves H and L. The value m1M(g) is displayed on a display circuit 13.

The next measurement of the unbalance value is carried out by attaching a weight of m1M(g) obtained in the above-mentioned step at a position of the wheel to which a counter-weight is to be attached. In this state, the actual unbalance value for the wheel can be designated as X-m1M(g). It is assumed in this measurement that the output of the analog-digital converting circuit 9 is $Y_2$.

A suitable curve according to the values of m1M(g), $Y_1$ and $Y_2$ is selected from the curves H, #2, #3, #4 and L stored in the memory circuit 10. This selecting manner will be explained hereinafter. First of all, the curve H next adjacent the curve M stored in the memory circuit 10 is specified by the control circuit 12. The unbalance values m1M(g) and m2H(g) corresponding to $Y_1$ and $Y_2$, respectively, are obtained by the selecting circuit 11. The following treatments are carried out:

(a)' If m1H−m2H>m1H, it is decided that the curve M is a true curve and that the weight m1H(g) is used as the true unbalance value.

(a) If m1H−m2H<m1M, then an instruction for shifting the curve from the curve H to the next curve #2 is issued from the control circuit 12.

(b) If m1H−m2H=m1M, then it is determined that the true curve T is identical with the curve H and the weight m2H(g) is displayed on the display circuit 13 as a weight to be attached.

In case of (a), the curve #2 has been selected, so that the unbalance values m12(g) and m22(g) corresponding to $Y_1$ and $Y_2$, respectively, are obtained by using the curve #2 and treated as above.

(c) If m12−m22<m1M, then an instruction for shifting the curve from the curve #2 to the next curve #3 is issued. This operation is repeated and finally the curve L is selected, the value obtained with respect to this curve L is used as the true unbalance value.

(d) If m12−m22=m1M, then it is determined that the true curve T is identical with the curve #2 and the weight m22(g) is displayed on the display circuit 13 as a weight to be attached.

(e) If m12−m22>m1M, then the curve is shifted from the curve #2 to the former curve H which is decided as the true curve and the weight m2H(g) is displayed on the display 13 as a weight to be attached as in the case (b).

As has been described, a curve corresponding to the values of $Y_1$, $Y_2$ and m1M is selected by using a selection circuit 11 and a weight to be attached thus obtained is displayed on the display circuit 13.

Then, the weight thus obtained is attached to the wheel 1 and the unbalance value is measured again and this procedure is repeated.

Further, it is to be understood that an error in weight less than 5 g–10 g may be allowed for the counterweight to be attached to the wheel 1 in practice.

Accordingly, a suitable value should be described in accordance with the allowance. Specifically, the allowance value is compared with the value applied on the display circuit 13 as a value of weight to be added and determined by the decision circuit 14 whether it is larger than that or not. If the value is larger than the allowance value, the value is displayed on the display circuit 13 as a value of weight to be attached. If the value is lower than the allowance value, the completion of the measurement is displayed on the display circuit 13, in such a way that OK signal which shows the fact that the value of weight is within the allowance value is displayed.

As stated above, in the present invention, in the first step the measurement is carried out and in the second step a curve similar to the true curve is selected from the unbalance value and the output corresponding thereto so that the unbalance value is calculated therefrom. Specifically, the measurement in the present invention can be finished by only substantially two steps.

Generally, the counter-weight corresponding to the unbalance is mounted on the outer side of the wheel because of the easiness of carrying out the mounting work of the counter-weight. In case that the unbalance value is very large, a large counter-weight is mounted on the outside of the wheel. This causes the dynamic balance to deteriorate. Accordingly, it is preferable that when an unbalance value over a predetermined limit value is displayed in the first step, the unbalance value to be mounted on the outside of the wheel is reduced by mounting a part of the counter-weight on the inner side of the wheel, and again the measurement of the unbalance value is carried out so that a large extent of out of dynamic balance can be avoided.

In the above embodiment, a weight to be added on the wheel for balancing is displayed on the display circuit. However, it should be understood that it may be possible to display the total weight to be attached to the wheel for balancing on the display circuit in the other embodiment.

As stated above, according to the present invention the unbalance value of the wheel can be reduced within the allowance value by at least two steps of measurement without being affected by the kinds of wheel and automobile and the mounting state of the pickup and it is not necessary to repeat the measurement many times. Further, according to the present invention the unbalance value can be obtained precisely and easily.

In summary, referring to FIGS. 1, 1(a) and 7, it is apparent that a method in accordance with the invention is carried out as follows:

A plurality of curves (M, H, #2, #3, #4 ... L) showing the relationship between the measured magnitude of vibration of a rotating wheel and the actual value of the unbalance according to the type of wheel or automobile on which the wheel is mounted are preliminarily determined and stored in the memory 10.

A first magnitude of vibration of a given wheel while it is rotated is measured by using the pickup 3 and the ($Y_1$) register in the A-D converting circuit 9. A first value of unbalance (m1M) corresponding to said first magnitude of vibration ($Y_1$) is obtained by using the curve (M) in the memory 10 which has the smallest value of unbalance for said first magnitude of vibration ($Y_1$).

A counter-weight corresponding to said first value of unbalance (m1M) is placed on the given wheel.

A second magnitude of vibration ($Y_2$) when the wheel is rotating is obtained by using the A-D converter in the A-D converting circuit 9.

The curve having the largest value of unbalance for said first magnitude of vibration ($Y_1$) but for which the change of unbalance corresponding to said first and second magnitudes of vibration ($Y_1$ and $Y_2$) does not exceed said first value of unbalance (m1M) is selected by using the selecting circuit 11.

Said selected curve and the second magnitude of vibration ($Y_2$) are used to determine a second value of unbalance (m2H).

The relationship between the circuits and the various functional steps specified in FIG. 7 is as follows and the bracketed numbers in the following explanation correspond to the unbracketed numbers shown in FIG. 7.

The A-D converting circuit 9, memory circuit 10 and selection circuit 11 are controlled by the sequence control circuit 12.

(101) The apparatus is started by the sequence control circuit 12.

(102) Y1 is measured by using the pickup 3 and A-D converter and Y1 register in the A-D converting circuit 9.

(103) m1M is obtained by using the curve M in the memory circuit 10 selected by the curve selecting circuit in the selection circuit 11.

(104) Y2 is measured by using the pickup 3 and A-D converter in the A-D converting circuit 9.

(105) m1H corresponding to Y1 and m2H corresponding to Y2 are obtained by using the next curve H in the memory circuit 10 selected by the curve selecting circuit in the selection circuit 11.

(106) The value of the m2n register which receives m2H is substracted from the value of the m1n register which receives m1H by the subtraction circuit in the selection circuit 11 and the result is compared with the value of the m1M register by the comparison circuit in the selection circuit 11.

(107) The curve is shifted to curve #3 by using the curve selecting circuit in the selection circuit 11.

(108) through (115) are similar steps to (105)–(107).

(116) The just previous curve of the curve now used in the memory circuit 10 is selected by using the curve selecting circuit in the selection circuit 11.

(117) The value of the m2n register in the selection circuit 11 corresponding to said previous curve is compared with the allowance value in the decision circuit 14. The result thereof is displayed in the display 13.

(118) is similar to (117).

The sequence control circuit 12 serves as to pickup stepwise each curve memorized in the memory 10.

The decision circuit 14 determines whether the value displayed on the display circuit 13 is larger than the allowable value or not.

In the selection circuit 11, a rough value of the unbalance is obtained from the magnitude of the vibration of the wheel, i.e., the signal from the pickup 3 and the selected curve in the memory 10.

We claim:

1. A method of measuring an unbalance value of a wheel comprising the steps of preliminarily determining and storing in a memory (10) a plurality of curves (M, H, #2, #3, #4 ... L) showing the relationship between the measured magnitude of vibration of a rotating wheel and the actual value of the unbalance according to the type of wheel or automobile on which the wheel is mounted; measuring by means of a sensing device (3) and converter circuit (9) a first magnitude of vibration (Y1) of a given wheel while it is rotated; obtaining a first value of unbalance (m1M) corresponding to said first magnitude of vibration (Y1) by using the curve (M) in said memory (10) which has the smallest value of unbalance for said first magnitude of vibration (Y1); placing a counter-weight corresponding to said first value of unbalance (m1M) on the given wheel and employing said sensing device (3) and said converter circuit (9) for obtaining a second magnitude of vibration (Y2) when the wheel is rotating; using a selector circuit (11) for selecting the curve having the largest value of unbalance for said first magnitude of vibration (Y1) but for which the difference between unbalances corresponding to said first and second magnitudes of vibration (Y1 and Y2) does not exceed said first value of unbalance (m1M); and using said selected curve and the second magnitude of vibration (Y2) to determine a second value of unbalance (m2M).

2. An apparatus for measuring an unbalance value of a wheel comprising detecting means (3, 9) for detecting and measuring a magnitude of vibration of a rotating wheel (1), memory means (10) for storing a plurality of curves (M, H, #2, #3, #3 ... L) showing the relation between a magnitude of vibration of the rotating wheel (1) and a value of unbalance which are obtained preliminarily according to the type of wheel or automobile on which the wheel is mounted, selecting means (11) for selecting a curve (M) stored in the memory means (10), means (14) for determining an unbalance value (m1M) from the selected curve (M) and for comparing an unbalance value from a first curve with the difference in unbalance values from a second curve due to a change in magnitude of vibration of said wheel, and means (12) for operating said selecting means (11) so as to select the curve for which the difference value is largest but which does not exceed the unbalance value from the first curve.

3. An apparatus as claimed in claim 2, further comprising means (13) for displaying an unbalance value and means (14) for comparing whether or not a value to be displayed on said display means (13) exceeds or equals an allowance value of the unbalance, and for enabling displaying of the value when it does.

* * * * *